(12) United States Patent
Ohshima

(10) Patent No.: US 11,500,242 B2
(45) Date of Patent: *Nov. 15, 2022

(54) OPTICAL SWITCHING ELEMENT

(71) Applicant: JVCKENWOOD CORPORATION, Yokohama (JP)

(72) Inventor: Katsunori Ohshima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,647

(22) Filed: Mar. 17, 2021

(65) Prior Publication Data
US 2021/0200056 A1    Jul. 1, 2021

Related U.S. Application Data

(63) Continuation of application No. PCT/JP2019/036440, filed on Sep. 18, 2019.

(30) Foreign Application Priority Data

Sep. 28, 2018 (JP) .............................. JP2018-185094

(51) Int. Cl.
*G02F 1/1335* (2006.01)
*G02F 1/31* (2006.01)

(52) U.S. Cl.
CPC ...... *G02F 1/133545* (2021.01); *G02F 1/1335* (2013.01); *G02F 1/133553* (2013.01); *G02F 1/133536* (2013.01); *G02F 1/31* (2013.01); *G02F 2201/123* (2013.01)

(58) Field of Classification Search
CPC ............. G02F 1/1335; G02F 1/133553; G02F 1/133536; G02F 1/133545
See application file for complete search history.

(56) References Cited

U.S. PATENT DOCUMENTS

| | | | |
|---|---|---|---|
| 2003/0081161 A1* | 5/2003 | Ozawa .............. | G02F 1/133536 349/115 |
| 2006/0170854 A1* | 8/2006 | Han ....................... | G02F 1/1339 349/153 |
| 2019/0243176 A1* | 8/2019 | Im ......................... | G02F 1/1362 |

FOREIGN PATENT DOCUMENTS

JP        2016-143037 A        8/2016

* cited by examiner

*Primary Examiner* — Dung T Nguyen
(74) *Attorney, Agent, or Firm* — Nath, Goldberg & Meyer; Jerald L. Meyer

(57) ABSTRACT

An optical switching element includes a driving substrate, a transparent substrate, a liquid crystal layer and a reflection enhancing film. The driving substrate includes a pixel region having a plurality of pixel electrodes, an outer peripheral region arranged outside the pixel region, and a sealing region. The transparent substrate includes a counter electrode. The liquid crystal layer is held between the driving substrate and the transparent substrate. The reflection enhancing film is arranged on a whole surface of the driving substrate. The reflection enhancing film is formed by stacking one or more of dielectric assemblies each of which includes a set of two stacked dielectric films with different refractive indexes. A dielectric film in a first layer of the reflection enhancing film is subject to planarization.

6 Claims, 5 Drawing Sheets

OPTICAL SWITCHING ELEMENT

CROSS REFERENCE TO RELATED APPLICATION

This is a continuation application based on PCT application No. PCT/JP2019/036440 filed on Sep. 18, 2019, which claims the benefit of priority from Japanese Patent Application No. 2018-185094 filed on Sep. 28, 2018, the entire contents of which are incorporated by reference herein.

BACKGROUND

The present invention relates to a structure of a reflection enhancing film in an optical switching element.

Recently, in the field of optical communications, cyclic optical network systems and optical wavelength multiplexing communication systems have been proposed to cope with the drastically increasing volume of information. In these optical communication systems, a Reconfigurable Optical Add Drop Multiplexer (ROADM) apparatus is employed. The ROADM apparatus can add or drop an optical signal without converting the optical signal to an electrical signal or repeating the optical signal.

As an optical switching device in the ROADM apparatus, a Wavelength Selective Switch (WSS) device is employed. The WSS device selects any wavelength from a plurality of wavelengths included in an optical signal and then allocates the selected wavelength to any input and output ports, which allows multiplexed wavelengths to be input and output. As the optical switching element in the WSS device, a Micro Electro Mechanical Systems (MEMS) mirror or a Liquid Crystal on Silicon (LCOS) element is employed.

The LCOS element is a reflection type liquid crystal element having a pixel region in which a plurality of reflection type pixel electrodes is arranged in a horizontal direction and a vertical direction. A refractive index of a liquid crystal on each pixel electrode is changed by controlling a voltage to be applied to the liquid crystal for each pixel electrode. A phase velocity of a signal light is controlled for each pixel by changing a refractive index of the liquid crystal on each pixel.

The LCOS element can control a tilt angle of a wave-front of a signal light according to a rate of change of a phase velocity by changing the phase velocity in stages for each pixel. Namely, the LCOS element functions as a phase modulation element that reflects a signal light in a predetermined direction by changing a phase velocity for each pixel.

Further, a reflection enhancing film is formed on the plurality of pixel electrodes by alternately stacking dielectric films with different refractive indices. The reflection enhancing film enhances a reflectance through an interference effect of light, which efficiently reflects a wavelength of a signal light. In the reflection enhancing film, a dielectric material with a high refractive index and a dielectric material with a low refractive index are alternately stacked at an optimum film thickness (optical film thickness=λ/4, where λ is a concerned wavelength). With this configuration, a reflected light from each dielectric interface is enhanced through an interference of light.

The MEMS mirror requires mirrors corresponding to the number of wavelength bands of a signal light. Due to this, when a wavelength band of a signal light or the number of wavelength bands of a signal light is changed, it is necessary to newly produce one or more mirrors as the MEMS mirror depending on contents of the change.

In comparison with the MEMS mirror, the LCOS element can perform a control for each pixel block generated by dividing a pixel region into a plurality of pixel blocks arbitrarily. Due to this, when a wavelength band of a signal light or the number of wavelength bands of a signal light is changed, it is not necessary to newly produce any element as the LCOS element because a plurality of pixel blocks is reconfigurable depending on contents of the change. Namely, the LCOS element has a better variable grid property than the MEMS mirror. One example of a phase modulation device with the LCOS element is disclosed in Japanese Patent Application Laid-Open No. 2016-143037 (Patent Document 1). Patent Document 1 discloses a method of correcting an applied voltage for a pixel to reduce a phase crosstalk of the LCOS element. However, Patent Document 1 does not disclose any control of a thickness of a liquid crystal layer to equalize an applied voltage.

When the LCOS element is employed as the optical switching element in the WSS device, the LCOS element reflects a signal light in a desired direction using a phase modulation. When the LCOS element is employed as the optical switching element, a liquid crystal layer in the LCOS element should have a thickness of about 5 μm to ensure a phase modulation of 2π. The reflection enhancing film is formed on the plurality of pixel electrodes, which is arranged on a driving substrate, by stacking about 5 pairs (10 layers) of dielectric films, and has a thickness of about 0.5 μm.

In the manufacture of the LCOS element, a seal material with appropriate flowability is used to paste a transparent substrate to the driving substrate opposed to the transparent substrate. Due to this, there is a possibility that the seal material flows out from a predetermined application position, flows into the pixel region, and reaches an end part (boundary) of the reflection enhancing film or an outermost surface of the reflection enhancing film. In this case, there is a possibility that the seal material rides on a step in the end part (boundary) of the reflection enhancing film or the outermost surface of the reflection enhancing film. This causes a thickness of the liquid crystal layer, which includes thicknesses of the driving substrate, in which the reflection enhancing film is located at an outer most surface, and the transparent substrate in the pixel region and, to be uneven.

At a portion where the thickness of the liquid crystal layer is uneven, an optimal phase modulation amount cannot be ensured, which deteriorates a performance as the optical switching element.

SUMMARY

According to a first aspect of the embodiments, there is provided an optical switching element including: a driving substrate that includes a pixel region having a plurality of pixel electrodes, an outer peripheral region arranged outside the pixel region, and a sealing region; a transparent substrate that includes a counter electrode; a liquid crystal layer held between the driving substrate and the transparent substrate; and a reflection enhancing film arranged on a whole surface of the driving substrate wherein the reflection enhancing film is formed by stacking one or more of dielectric assemblies each of which includes a set of two stacked dielectric films with different refractive indexes, and a dielectric film in a first layer of the reflection enhancing film is subject to planarization.

According to a second aspect of the embodiments, there is provided an optical switching element including: a driving substrate that includes a pixel region having a plurality of pixel electrodes, an outer peripheral region arranged outside the pixel region, and a sealing region; a transparent substrate that includes a counter electrode; a liquid crystal layer held between the driving substrate and the transparent substrate; and a reflection enhancing film arranged on upper surfaces of the pixel region, the outer peripheral region and the sealing region, wherein the reflection enhancing film is formed by stacking one or more of dielectric assemblies each of which includes a set of two stacked dielectric films with different refractive indexes, and a dielectric film in a first layer of the reflection enhancing film is subject to planarization.

DETAILED DESCRIPTION

Embodiments will be described below with reference to the drawings. More specifically, a configuration of a reflection enhancing film which is a main part of an optical switching element according to the embodiments, will be described.

An example of a configuration of the optical switching element will be described with reference to FIGS. 1 to 5. In the present embodiment, as one example of the optical switching element, an LCOS element which is a reflection type liquid crystal element, will be described.

Figure 1:
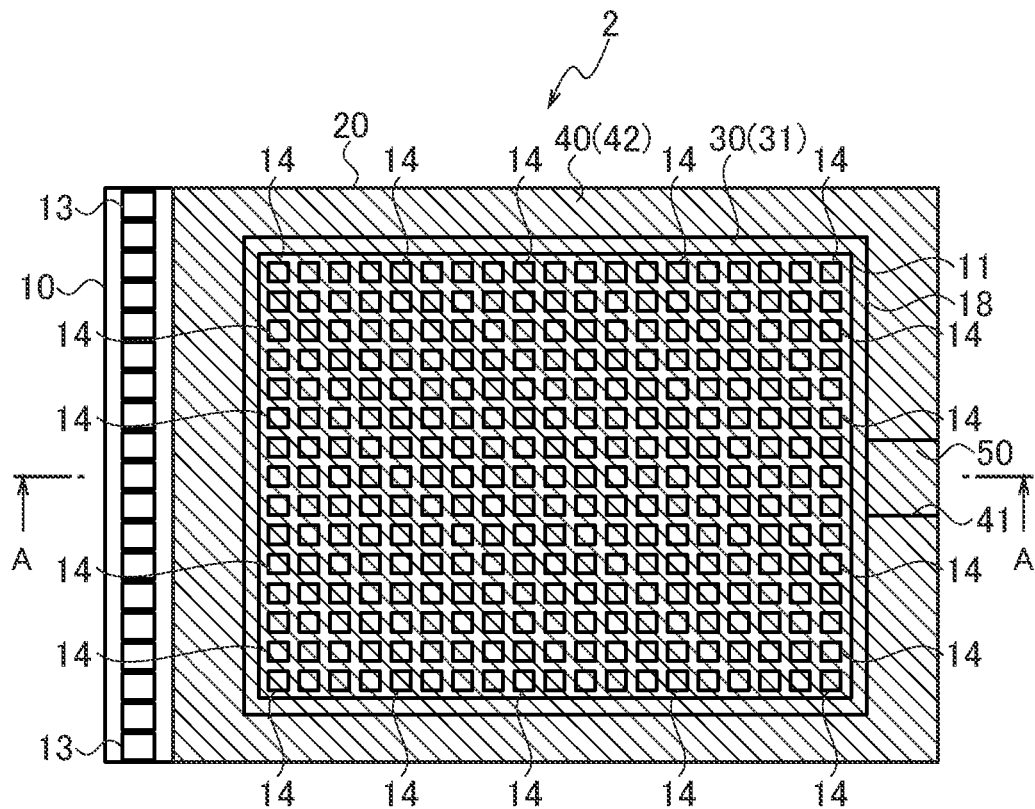
FIG. 1 is a top view illustrating a film deposition area of a reflection enhancing film of an optical switching element according to an embodiment.
Figure 5:
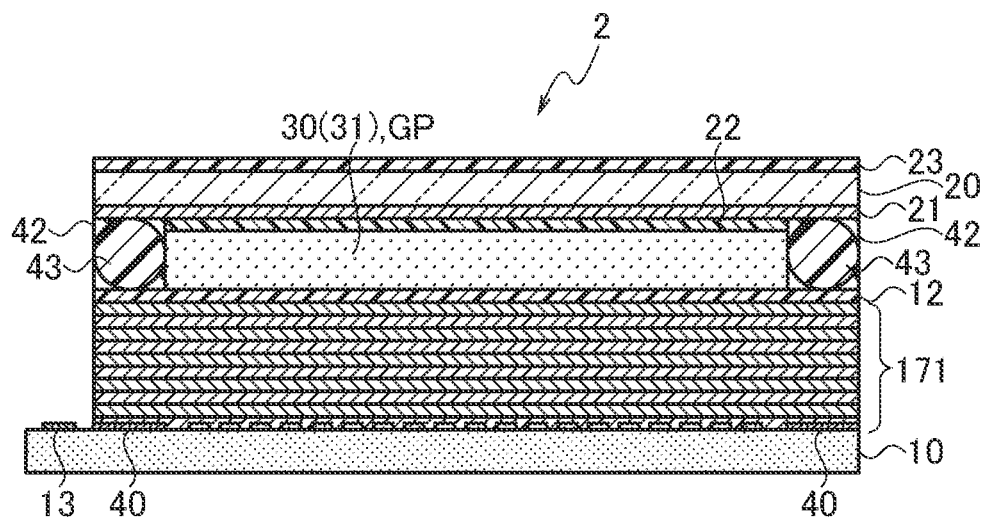
FIG. 5 is a cross-sectional view illustrating an example of a configuration of the optical switching element according to the embodiment.

As illustrated in FIGS. 1 and 5, an optical switching element 2 includes a driving substrate 10, a transparent substrate 20, a liquid crystal 31 with which a liquid crystal layer 30 is filled, a seal material 42 including a spacer material 43 applied to and formed on a sealing region 40, and a sealing material 50. The driving substrate 10 and the transparent substrate 20 are also called a first substrate and a second substrate, respectively. The seal material 42 and the sealing material 50 are photo-curable resins, for example, ultraviolet-curable resins. The seal material 42 and the sealing material 50 can be the same kinds of photo-curable resins or different kinds of photo-curable resins.

The driving substrate 10 includes a pixel region 11, an outer peripheral region 18 and the sealing region 40. In the pixel region 11, a plurality of pixel electrodes 14 with light reflecting is arranged in a horizontal direction and a vertical direction. One pixel electrode 14 corresponds to one pixel. The outer peripheral region 18 surrounds the pixel region 11. The sealing region 40 surrounds the outer peripheral region 18.

A reflection enhancing film 171 is formed at least on the pixel region 11, among the pixel region 11, the outer peripheral region 18 and the sealing region 40. An alignment film 12 is formed at least on the reflection enhancing film 171. A plurality of connection terminals 13 is formed on an outer peripheral portion of the driving substrate 10.

The driving substrate 10 is a semiconductor substrate, more specifically, a silicon substrate. On the driving substrate 10, a driving circuit (not shown) for driving each pixel is formed below each pixel electrode 14. As materials of the pixel electrodes 14 and the connection terminals 13, aluminum or aluminum alloys can be used.

The transparent substrate 20 includes a counter electrode 21 and an alignment film 22. The counter electrode 21 corresponds to the pixel electrodes 14. The alignment film 22 is formed on the counter electrode 21. The driving substrate 10 and the transparent substrate 20 are arranged such that the pixel electrodes 14 are opposed to the counter electrode 21.

The driving substrate 10 and the transparent substrate 20 are fixed by the seal material 42 and the sealing material 50 such that a gap GP is formed between the driving substrate 10 and the transparent substrate 20. The liquid crystal layer 30 is formed in the gap GP between the driving substrate 10 and the transparent substrate 20 and held between the driving substrate 10 and the transparent substrate 20. The liquid crystal layer 30 is formed on an assembly of the pixel electrodes 14, the reflection enhancing film 171 and the alignment film 12. An antireflection film 23 can be formed on a surface opposite to a surface on which the counter electrode 21 of the transparent substrate 20 is formed. As the antireflection film 23, a dielectric multilayer film can be used.

The transparent substrate 20, the counter electrode 21 and the alignment film 22 have light transmission properties. As the transparent substrate 20, an alkali-free glass substrate or a quartz glass can be used. As a material of the counter electrode 21, an ITO (Indium Tin Oxide) can be used. It is noted that a dielectric film with light transmission property can be formed on each of an upper side and a lower side of ITO film.

The seal material 42 is applied on and formed on the sealing region 40 along the outer peripheral region 18 which is an outer peripheral portion of the pixel region 11 such that the seal material 42 surrounds the pixel region 11 and the outer peripheral region 18. The liquid crystal layer 30 is formed by injecting the liquid crystal 31 into the gap GP between the driving substrate 10 and the transparent substrate 20 from a liquid crystal injection portion 41 of the seal material 42 and by sealing the liquid crystal injection portion 41 with the sealing material 50. A thickness of the liquid crystal layer 30 in the optical switching element 2 is 5 μm, for example.

A driving signal for driving the liquid crystal 31 is input into a certain connection terminal 13 among the connection terminals 13. The driving circuit formed on the driving substrate 10 applies a driving voltage based on the driving signal, to the corresponding pixel electrode 14. This drives the liquid crystal 31 for each pixel according to a voltage difference between the corresponding pixel electrode 14 and the counter electrode 21.

Figure 2:
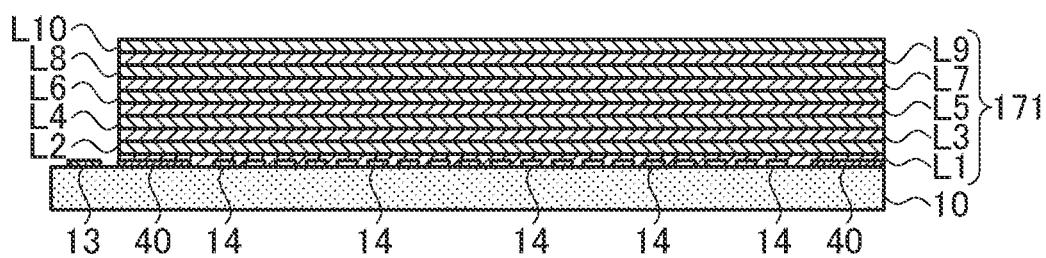
FIG. 2 is a cross-sectional view illustrating an example of a configuration of the reflection enhancing film of the optical switching element according to the embodiment.

Next, a configuration of the reflection enhancing film 171 formed on the pixel region 11, the outer peripheral region 18 and the sealing region 40, will described below in detail. In the pixel region 11 indicated by oblique lines in FIG. 1, the plurality of pixel electrodes 14 is arranged. Due to this, a surface of the pixel region 11 in which only the pixel electrodes 14 are arranged, has an uneven shape before the reflection enhancing film 171 is formed. As illustrated in FIG. 2, the reflection enhancing film 171 is formed by laminating dielectric thin films made of dielectric material (for example, SiO2: silicon dioxide) on the pixel region 11, the outer peripheral region 18 and the sealing region 40.

First, as a part of first layer of the reflection enhancing film 171, an SiO2 film (a part of layer L1) is formed on the pixel region 11, the outer peripheral region 18 and the sealing region 40 by a vacuum vapor deposition method or the like. It is noted that an SiO2 layer formed as described above, is a thin film and has a surface with an uneven shape which reflects the uneven shape of the surface of the pixel region 11 (lower layer) in which only the pixel electrodes 14 are arranged before the reflection enhancing film 171 is formed. The first layer (L1) can be formed in a wafer state in a semiconductor manufacturing process for manufacturing the driving substrate 10.

In order to flatten the uneven shape of the surface of the SiO2 film after formed, the surface of the SiO2 film is planarized by a chemical machinery polishing (CMP) method or the like. That is, the SiO2 film which is the part of first layer is subject to planarization. It is noted that the SiO2 film (a whole of layer L1) which is a whole of first layer may be subject to planarization. Although the chemical machinery polishing is described as one example of the planarization method, the planarization method is not limited thereto. A chemical etching method or the like can be used. It is noted that the planarization method can be performed in a semiconductor wafer state.

Subsequently, on the planarized surface of the SiO2 film (the part of layer L1), a dielectric assembly including a set of two stacked films with a combination of a low refractive index film SiO2 (e.g., the remaining part of layer L1 or layer L3, L5, L7 or L9) and a high refractive index film Si3N4 (e.g., layer L2, L4, L6, L8 or L10), is stacked repeatedly. The reflection enhancing film 171 is formed by stacking the dielectric assembly repeatedly from layer L1 to layer L10.

Figure 3:
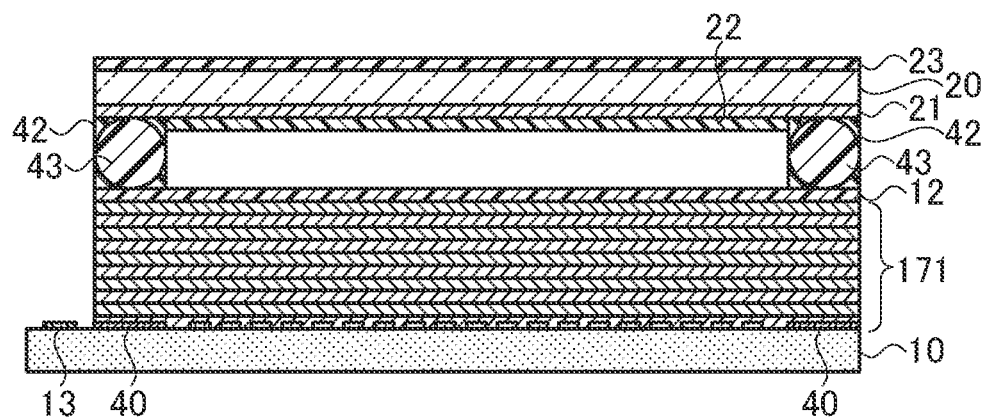
FIG. 3 is a diagram illustrating a regular positional relation among a driving substrate, a transparent substrate and a seal material of the optical switching element according to the embodiment.
Figure 4:
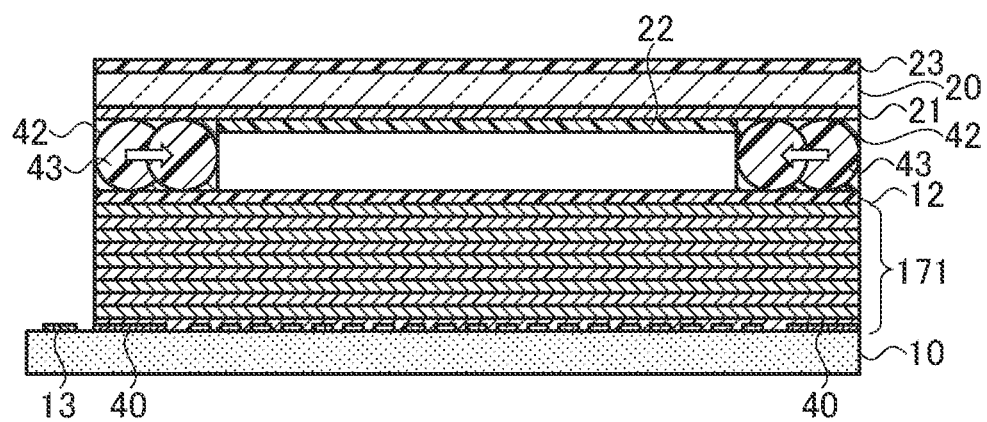
FIG. 4 is a diagram illustrating a positional relation where the seal material is away from a sealing region when the transparent substrate is pasted to the driving substrate of the optical switching element according to the embodiment.

FIG. 3 illustrates a state where the transparent substrate 20 and the driving substrate 10 on which the reflection enhancing film 171 is formed, are pasted to each other via the seal material 42, at a regular position where an application position of the seal material 42 is not shifted away from the sealing region 40. FIG. 4 illustrates a state where the transparent substrate 20 and the driving substrate 10 on which the reflection enhancing film 171 is formed, are pasted to each other via the seal material 42, at an irregular positon where the application position of the seal material 42 is shifted away from the sealing region 40. FIG. 5 illustrates a configuration of the completed optical switching element 2.

Figure 6A:
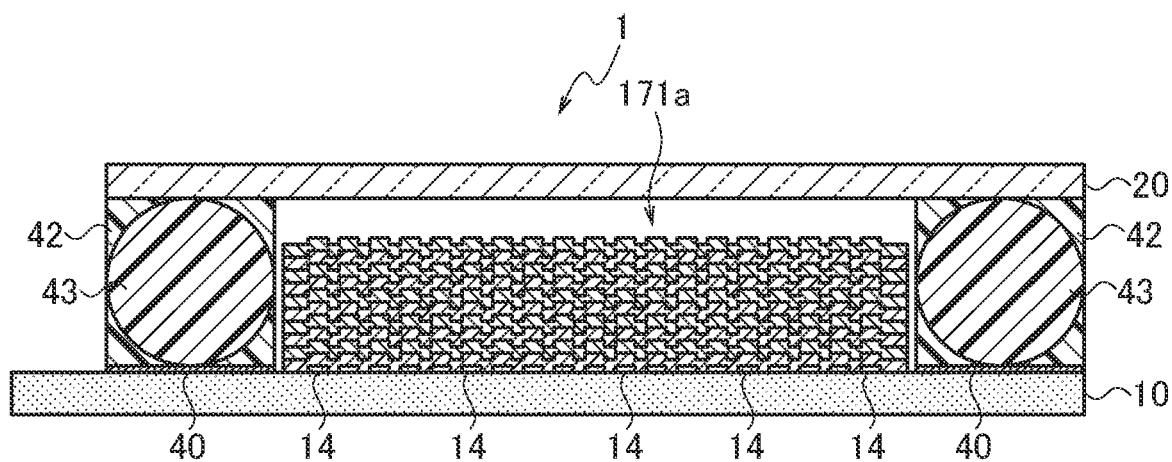
FIG. 6A is a diagram illustrating a regular positional relation between the driving substrate and the transparent substrate of the optical switching element.
Figure 6B:
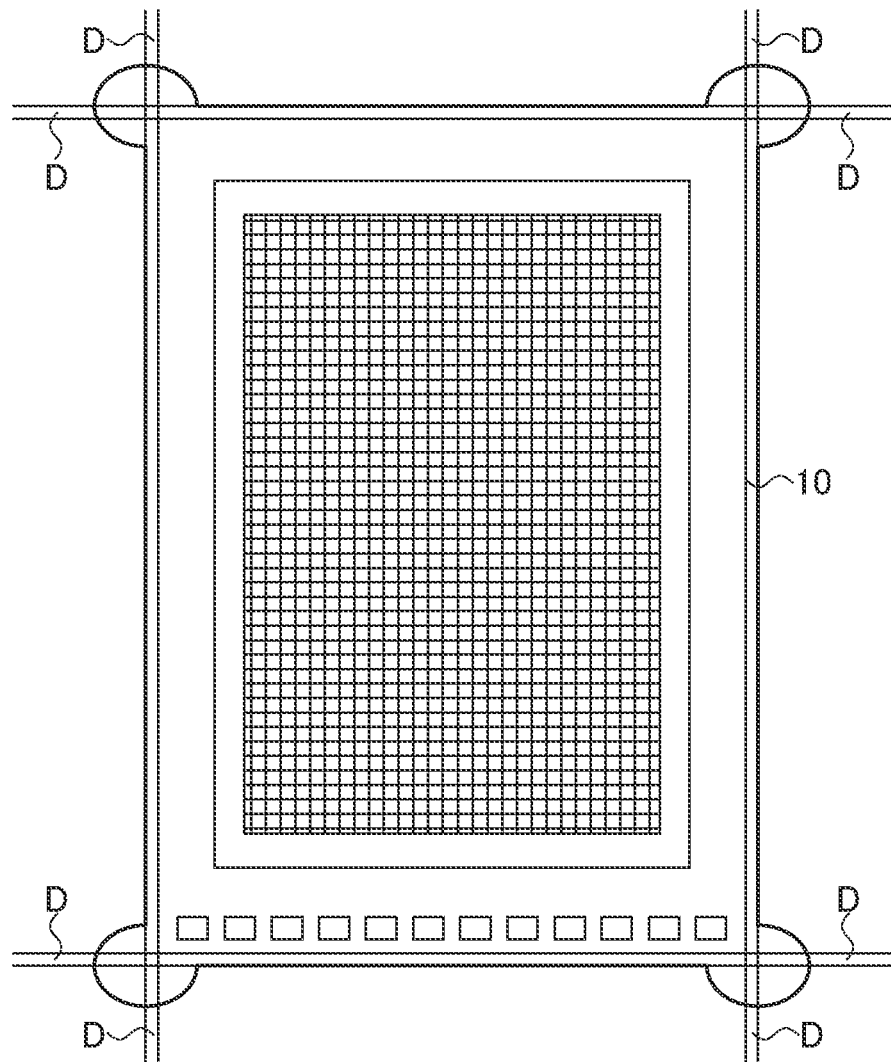
FIG. 6B is a diagram illustrating a positional relation between the driving substrate and a positioning tool.

According to conventional arts, when the seal material 42 does not flow out in the optical switching element 1 as illustrated in FIG. 6A, the driving substrate 10 and the transparent substrate 20 are properly pased to each other via the seal material 42. In contrast, when the seal material 42 flows into a region where the reflection enhancing film 171a is formed, along a direction of an arrow as illustrated in each of FIGS. 6C and 6D, the seal material 42 contacts with an end part (boundary) of the reflection enhancing film 171a, which brings unevenness of the liquid crystal layer 30 and rattling of the optical switching element 1 (not illustrated).

According to conventional arts, the reflection enhancing film 171a is formed in the pixel region 11. When each dielectric film is formed by the vacuum vapor deposition, in a state where the driving substrate 10 is hold by a positioning tool, a film formation is performed while the positioning tool is revolving and rotating. Due to this, a film formation region on the driving substrate 10 is positioned apart from the driving substrate 10 by an aperture mask with a predetermined opening (not illustrated), but with a small gap D to allow the driving substrate 10 to be detached.

Figure 6C:
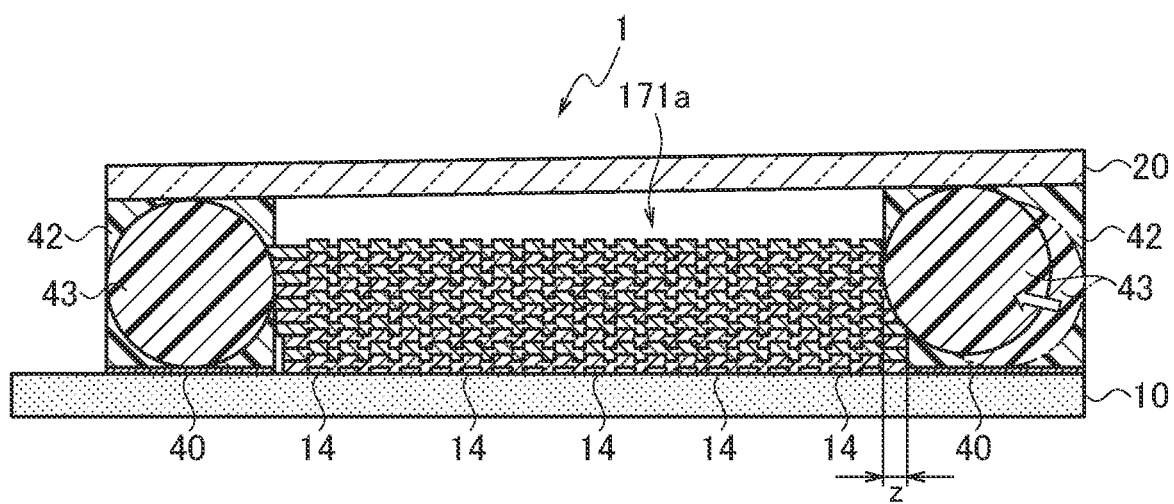
FIG. 6C is a diagram illustrating a positional relation when a transparent substrate is improperly pasted to a driving substrate of a conventional optical switching element.
Figure 6D:
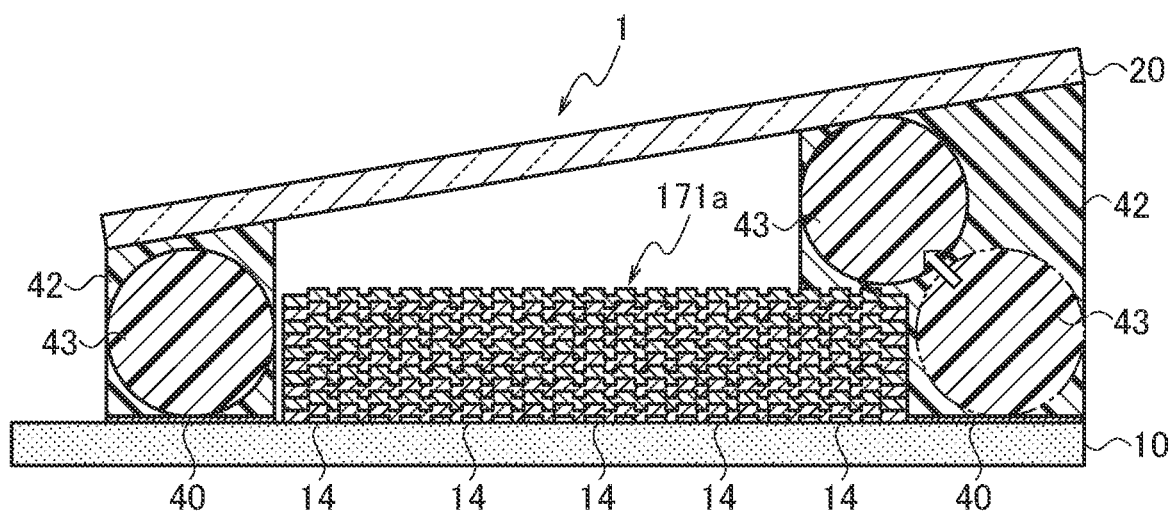
FIG. 6D is a diagram illustrating a positional relation when a transparent substrate is improperly pasted to a driving substrate of a conventional optical switching element.

Due to this gap D, when each dielectric film is formed, the driving substrate 10 can slightly move in the positioning tool. Due to this, there is a possibility that end parts of dielectric films are slightly shifted by an amount Z as indicated in FIG. 6C.

In the present embodiment, since each of the films forming the second layer (L2) to the tenth layer (L10) has a surface with a flat shape without uneven by performing the planarization method after the part or whole of the first layer (L1) is formed, the reflection enhancing film 171 has a surface with a flat shape without uneven as illustrated in FIGS. 1 and 2. The reflection enhancing film 171 is formed (arranged) on the whole surface of the driving substrate 10, excluding the outer peripheral portion of the driving substrate 10 where the connection terminals 13 are formed. If there is an outer peripheral region (not illustrated) outside the sealing region 40, the reflection enhancing film 171 can be formed on the outer peripheral region. Even if the seal material 42 is shifted away from the sealing region 40 and flows into the outer peripheral region 18 from the sealing region 40 along a direction of an arrow as illustrated in FIGS. 3 and 4, since each of the pixel region 11, the outer peripheral region 18 and the sealing region 40 has a surface with a flat shape without uneven in the present embodiment, the driving substrate 10 and the transparent substrate 20 can be pasted to each other with uniform thickness.

As one example of the configuration of the reflection enhancing film 171, the reflection enhancing film 171 is formed by stacking a pair of a low dielectric film SiO2 (L1) and a high dielectric film Si3N4 (L2) repeatedly from L1 to L10. As one example of a thickness of each dielectric film in the reflection enhancing film 171, when a concerned wavelength λ is 350 nm, a refractive index nd1 of the low dielectric film SiO2 is 1.48, a thickness of the low dielectric film SiO2 is $(\lambda/4)/nd1=(350/4)/1.48=59.10$ nm, a refractive index nd2 of the high dielectric film Si3N4 is 2.10 and a thickness of the high dielectric film Si3N4 is $(\lambda/4)/nd2=(350/4)/2.10=41.60$ nm.

In the conventional arts, since the reflection enhancing film 171a is not formed on the sealing region 40, a thickness of the liquid crystal layer 30 is determined by the spacer material 43 with a particle diameter which is substantially the same as a thickness of the liquid crystal layer 30. In contrast, in the present embodiment, since the reflection enhancing film 171 is formed on the pixel region 11, the outer peripheral region 18 and the sealing region 40, if the spacer material 43 with a particle diameter which is smaller by the thickness of the reflection enhancing film 171 is used, the same thickness of the liquid crystal layer 30 as in the conventional can be achieved.

According to the configuration of the reflection enhancing film 171 of the optical switching element 2, since each of the pixel region 11, the outer peripheral region 18 and the sealing region 40 has a surface with a flat shape without uneven, the driving substrate 10 and the transparent substrate 20 can be pasted to each other with uniform thickness even if the seal material 42 is shifted away from the sealing region 40 and flows into the outer peripheral region 18 from the sealing region 40. Also, according to the configuration of the reflection enhancing film 171 of the optical switching element 2, since there is not any film end part (boundary) in the reflection enhancing film 171 and the reflection enhancing film 171 does not have a surface with uneven shape, it is possible to suppress deterioration of the performance of the optical switching element 2 due to a variation in the thickness of the liquid crystal layer 30.

Further, according to the configuration of the reflection enhancing film 171 of the optical switching element 2, since a signal light entering the LCOS element or being reflected by the LCOS element is not scattered and diffracted due to the reflection enhancing film 171 does not have a surface with an uneven shape, it is possible to obtain the reflection properties consistent with optical simulations. This can suppress deterioration of the performance of the optical switching element 2 due to a variation in the thickness of the liquid crystal layer 30.

The present invention is not limited to the above-described embodiment and various modifications are possible without departing from the gist of the present invention. For example, modifications can be made according to the required performance such as stacking about 10 pairs (20 layers) of dielectric layers in order to reflect signal light in an even narrower band.

According to the configuration of the reflection enhancing film of the optical switching element of the present embodiment, when the LCOS element is used as the optical switching element, it is possible to suppress deterioration of the performance of the optical switching element due to a variation in the thickness of the liquid crystal layer.

What is claimed is:

1. An optical switching element comprising:
   a driving substrate that includes a pixel region having a plurality of pixel electrodes, an outer peripheral region arranged outside the pixel region, and a sealing region;
   a transparent substrate that includes a counter electrode;
   a liquid crystal layer held between the driving substrate and the transparent substrate;
   a reflection enhancing film arranged on a whole surface of the driving substrate; and
   a spacer arranged between the reflection enhancing film and the counter electrode in the sealing region,
   wherein
   the reflection enhancing film is formed by stacking one or more of dielectric assemblies each of which includes a set of two stacked dielectric films with different refractive indexes, and
   a dielectric film in a first layer of the reflection enhancing film is subject to planarization for flattening an uneven shape of a surface of the dielectric film in the first layer which reflects an uneven shape of the pixel electrodes.

2. The optical switching element according to claim 1, wherein the optical switching element is a Liquid Crystal on Silicon (LCOS) and reflects a signal light in a predetermined direction using a phase modulation.

3. The optical switching element according to claim 1, wherein the dielectric film in the first layer of the reflection enhancing film is $SiO_2$.

4. The optical switching element according to claim 1, wherein the sealing region includes a seal material and a sealing material therein.

5. An optical switching element comprising:
   a driving substrate that includes a pixel region having a plurality of pixel electrodes, an outer peripheral region arranged outside the pixel region, and a sealing region;
   a transparent substrate that includes a counter electrode;
   a liquid crystal layer held between the driving substrate and the transparent substrate;
   a reflection enhancing film arranged on upper surfaces of the pixel region, the outer peripheral region and the sealing region; and
   a spacer arranged between the reflection enhancing film and the counter electrode in the sealing region,
   wherein
   the reflection enhancing film is formed by stacking one or more of dielectric assemblies each of which includes a set of two stacked dielectric films with different refractive indexes, and
   a dielectric film in a first layer of the reflection enhancing film is subject to planarization for flattening an uneven shape of a surface of the dielectric film in the first layer which reflects an uneven shape of the pixel electrodes.

6. The optical switching element according to claim 5, wherein each dielectric assembly in the reflection enhancing film comprise $SiO_2$ and $Si_3N_4$.

* * * * *